C. O. ANDERSON.
TEAT CUP.
APPLICATION FILED DEC. 4, 1915.
1,236,036.
Patented Aug. 7, 1917.
2 SHEETS—SHEET 1.
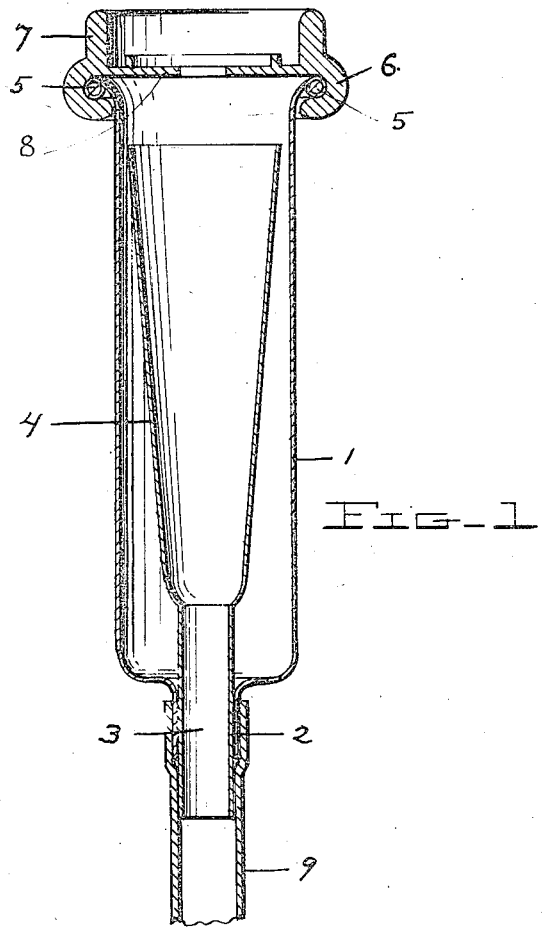
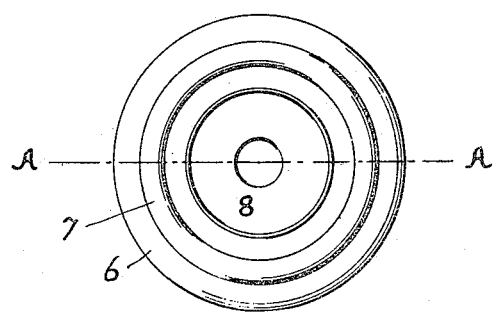
Inventor
Carl Oscar Anderson
John J Thompson
Attorney

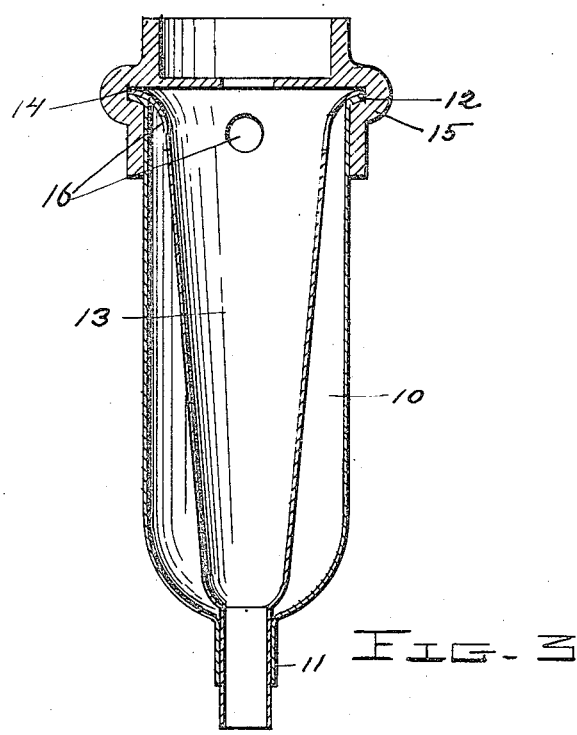
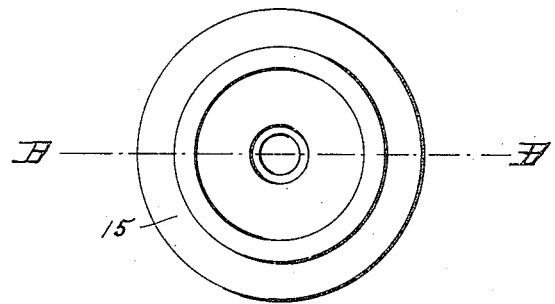

UNITED STATES PATENT OFFICE.

CARL OSCAR ANDERSON, OF LANCASTER, PENNSYLVANIA.

TEAT-CUP.

1,236,036.

Specification of Letters Patent.

Patented Aug. 7, 1917.

Application filed December 4, 1915. Serial No. 64,980.

*To all whom it may concern:*

Be it known that I, CARL OSCAR ANDERSON, a citizen of the United States, residing at Lancaster, in the county of Lancaster and State of Pennsylvania, have invented certain new and useful Improvements in Teat-Cups, of which the following is a specification, reference being had therein to the accompanying drawing.

This invention relates to an improved form of teat cup for milking machines, and which is adaptable to many forms of milking machines, but more particularly to that shown and described in United States Letters Patent No. 1,113,942, issued to me on October 20, 1914, and Patent No. 1,162,844 issued to me on December 7, 1915.

One of the objects of the invention is to produce a teat cup which shall be simple, consisting of few parts, easily cleaned and adjustable, and not being harsh in its operation.

Another object of the invention is to produce a teat cup of a tapered form, which, when the suction is applied, on account of its shape, squeezes the teat as it is pulled by the suction. Then it is released by the air pressure and the operation repeated in a pulsating form, or similar to the operation of hand milking.

With these and other objects in view, my invention consists in certain construction and combination of parts as will hereinafter be fully described and claimed in the specification, and illustrated in the accompanying drawings, which form a part of this application, and in which like figures of reference refer to corresponding parts in all of the views; but it is fully understood that while I have here described my device as shown, that I do not confine myself to the exact design, as slight changes may be made in the construction and arrangement of the several parts without departing from the spirit of the invention.

In the drawings:—

Figure 1, is a vertical section of my improved teat cup, taken on the line A—A of Fig. 2.

Fig. 2, is a top plan view of the teat cup.

Fig. 3, is a vertical sectional view of a modified form, taken on the line B—B of Fig. 4.

Fig. 4, is a top plan view of the modified form.

Referring to the drawings, and particularly to Figs. 1, and 2, the teat cup comprises a tubular metallic outer casing 1, reduced at its lower portion to form a neck or nipple 2, within which is slidably mounted a tube 3, connected to the teat cup 4, which is tapered or funnel shaped, and which is mounted within the casing 1, in axial relation thereto. The upper end of said casing 1, is rolled over as at 5, and is capped with the usual rubber or other resilient cap 6, formed with the upper portion 7, and the perforated diaphragm 8, through which the teat is inserted.

The neck or nipple 2 and the projecting end of tube 3, is embraced by the end of a rubber tubing 9, which leads to the exhaust pump.

In the modified form shown in Figs. 3, and 4, the outer casing 10, is provided at its lower end with a nipple 11, and is flanged at its upper end as at 12, while the tapered teat cup 13, runs the full height of the casing 10, and the upper or flanged edge 14, thereof is embraced by the rubber cap 15; while said teat cup 13, is provided with a series of holes 16, in the walls thereof, near the upper end for the admission of the air, which is supplied by the usual suction hose connected to the nipple 11 and the teat cup tube.

In the operation of the device a suction space is formed between the teat cup 4, and the casing 1, the air entering a hose or tubing 9, passing up through the teat cup 4, over the upper end thereof, and down between the teat cup 4, and the casing 1, thus when suction is applied through the tubing 9, the suction is entirely on the teat drawing it into the teat cup, and owing to the tapered form, squeezing it at the same time; while the instant the suction is released, the air in the suction space between the casing 1, and the teat cup 4, tends to withdraw the teat from the cup, and as this operation is continuously repeated, the teat is alternately squeezed, sucked, and released.

Having thus described my invention what I claim as new, and desire to secure by Letters Patent is:—

1. A teat cup comprising a rigid outer casing supplied at its upper end with a resilient cap formed with an orifice in the center thereof, a tapered rigid teat cup adjustably mounted within said casing and extending through the contracted lower end thereof forming a suction chamber between said teat cup and casing, with a suction passage at the upper or large end of the tapered cup for admitting suction to said chamber, and a suction hose connecting to the contracted end of the tapered cup and casing.

2. A teat cup comprising an outer casing having a contracted lower end, a resilient diaphragm provided with a teat passage at its center, an inner tapered rigid teat supporting cup extending through and held adjustably in said contracted end of the casing forming a suction chamber between said teat cup and said casing, with a passage at the large end of the tapered cup for admitting suction to the suction chamber, and a suction hose connected to the ends of the tapered cup and casing.

3. A teat cup comprising an outer casing having at its upper end means for making a practically airtight junction with the teat and having its lower end contracted, an inner tapering teat supporting cup slightly extending through the contracted end of said casing and removably held thereby, a suction hose connected thereto overlapping also the contracted end of the casing supplying intermittent suction to the tapered cup and through a passage at the large end of the tapered cup to the chamber formed between said cup and the casing.

In testimony whereof, I affix my signature in presence of two witnesses.

CARL OSCAR ANDERSON.

Witnesses:
  JOHN J. THOMPSON,
  A. F. SHENCK.

Copies of this patent may be obtained for five cents each, by addressing the "Commissioner of Patents, Washington, D. C."